United States Patent
Micheaux et al.

(10) Patent No.: US 12,402,633 B2
(45) Date of Patent: Sep. 2, 2025

(54) PIZZA DOUGH FOR LATER USE AND PROCESS FOR PREPARING SAME

(71) Applicant: CERELIA, Lievin (FR)

(72) Inventors: Claire Micheaux, Quesnoy-sur-Deule (FR); Mathieu Heinrich, Haguenau (FR); Gérard Fritsch, Mundolsheim (FR)

(73) Assignee: CERELIA, Lievin (FR)

( * ) Notice: Subject to any disclaimer, the term of this patent is extended or adjusted under 35 U.S.C. 154(b) by 602 days.

(21) Appl. No.: 17/516,571

(22) Filed: Nov. 1, 2021

(65) Prior Publication Data
US 2022/0142182 A1    May 12, 2022

(51) Int. Cl.
| | | |
|---|---|---|
| *A21D 10/02* | (2006.01) | |
| *A21D 2/02* | (2006.01) | |
| *A21D 2/14* | (2006.01) | |
| *A21D 2/16* | (2006.01) | |
| *A21D 2/18* | (2006.01) | |
| *A21D 6/00* | (2006.01) | |
| *A21D 8/04* | (2006.01) | |
| *B65B 25/00* | (2006.01) | |
| *B65B 31/04* | (2006.01) | |

(52) U.S. Cl.
CPC .............. *A21D 10/025* (2013.01); *A21D 2/02* (2013.01); *A21D 2/145* (2013.01); *A21D 2/165* (2013.01); *A21D 2/181* (2013.01); *A21D 2/183* (2013.01); *A21D 6/001* (2013.01); *A21D 8/047* (2013.01); *B65B 25/001* (2013.01); *B65B 31/04* (2013.01)

(58) Field of Classification Search
None
See application file for complete search history.

(56) References Cited

U.S. PATENT DOCUMENTS

| | | | |
|---|---|---|---|
| 2005/0266119 A1 | 12/2005 | Lonergan | |
| 2007/0166446 A1* | 7/2007 | Boursier | A21D 2/183 |
| | | | 426/549 |
| 2009/0130252 A1 | 5/2009 | Domingues | |
| 2011/0300265 A1* | 12/2011 | Feng | A23L 3/3463 |
| | | | 426/94 |
| 2012/0225169 A1 | 9/2012 | Domingues et al. | |

FOREIGN PATENT DOCUMENTS

| | | | | |
|---|---|---|---|---|
| AU | 2013 231 190 | | 10/2013 | |
| AU | 2013231190 A1 | * | 10/2013 | |
| FR | 3 062 032 | | 7/2018 | |
| FR | 3062032 A1 | * | 7/2018 | |
| FR | 2011470 | * | 9/2020 | |
| JP | 3696566 B2 | * | 9/2005 | ............... A21D 2/08 |
| JP | 2010088356 A | * | 4/2010 | |

OTHER PUBLICATIONS

"New generation of healthy baking powder" by Jungbunzlauer.com date Jun. 16, 2018, pp. 16 (Year: 2018).*
International Search Report dated Jun. 30, 2021.

* cited by examiner

*Primary Examiner* — Jyoti Chawla
(74) *Attorney, Agent, or Firm* — IPSILON USA, LLP

(57) ABSTRACT

Pizza dough for later use, which can be stored at refrigeration temperature for up to 100 days with artisanal quality, comprising in percentage by weight of the finished product: flour (50-65), water (20-35), fats (0-8), salt (0.7-2), sugar (0-2), deactivated yeast (0.05-0.15), fermented flour (0.1-2), vinegar (0.1-2), baking powders (0.5-2), gums (0.1-3).

10 Claims, No Drawings

PIZZA DOUGH FOR LATER USE AND PROCESS FOR PREPARING SAME

RELATED APPLICATION

This application claims the benefit of priority from French Patent Application No. 20 11470, filed on Nov. 9, 2020, the entirety of which is incorporated by reference.

FIELD OF THE INVENTION

The invention relates to a pizza dough for later use and process for preparing same.

DESCRIPTION OF RELATED ART

Pizza is a food product that is in high demand by consumers for its convenience, its taste and its crunchy-moist texture with a heterogeneous crumb and a crunchy bottom.

There are industrially prepared and frozen dough pieces, to be shaped, topped, and baked at the time of consumption. There are also industrially prepared dough pieces, which are stored at refrigeration temperature for a few days to a few weeks, with a significant variation in their qualities during their shelf life of generally about a month.

Document FR 3 062 032 describes a pizza dough for later use, which can be stored at refrigeration temperature for several weeks. This pizza dough comprises basic constituents (flour, water, vegetable oil, salt, sugar, deactivated yeast) and specific constituents (baker's yeast, alcohol, gluten, ascorbic acid, emulsifier). The baker's yeast changes during storage at refrigeration temperature and limits the shelf life of the dough to about a month. Alcohol and gluten are obstacles to the distribution of the dough to all consumers.

OBJECTS AND SUMMARY

One aim of the invention is to provide a pizza dough for later use, which leaves to the user only the rolling out, topping, and baking of the pizza prior to serving.

A further aim of the invention is to provide food service professionals and consumers with a pizza dough in the form of fresh dough pieces having a shelf life of about 100 days.

A further aim of the invention is to provide a pizza dough for later use having constant organoleptic qualities throughout its shelf life.

The subject matter of the invention is a pizza dough for later use, comprising in percentage by weight of the finished product:
  Flour: 50-65
  Water: 20-35
  Fats: 0-8
  Salt: 0.7-2
  Sugar: 0-2
  Deactivated yeast: 0.05-0.15
characterized in that it comprises, in percentage by weight of the finished product:
  Fermented flour: 0.1-2
  Vinegar: 0.1-2
  Baking powders: 0.5-2
  Gums: 0.1-3

According to an embodiment, the baking powders are a mixture of potassium bicarbonate (30 to 55%) and glucono-delta-lactone (45 to 70%).

According to an embodiment, the gums are a mixture of xanthan (50 to 70%) and guar flour (30 to 50%).

According to an embodiment, at least one of the gums is replaced by chicory fibre.

According to an embodiment, the fats consist of sunflower fat, rapeseed oil, and olive oil.

According to an embodiment, sunflower fat and rapeseed oil each constitute 50% by weight of the fats.

According to an embodiment, sunflower fat, rapeseed oil, and olive oil each constitute one third of the weight of the fats.

According to an embodiment, the pizza dough can be stored for up to 100 days at refrigeration temperature, under vacuum or under an atmosphere of nitrogen or of a mixture of nitrogen and carbon dioxide, with an oxygen content below 0.5%.

According to an embodiment, the pizza dough can be stored for up to 100 days at refrigeration temperature, under vacuum after hardening in an enclosure at a temperature comprised between −20° C. and −35° C.

According to an embodiment, the flour has an ash content of T40 or below.

Another subject matter of the invention is a process for preparing pizza dough for later use, characterized by the steps of:
  a) mixing the dry components and then adding the liquid components,
  b) kneading for between 3 and 9 minutes,
  c) dividing into dough pieces of the desired weight,
  d) rolling the dough pieces,
  e) rolling out according to the desired final format: ball or roll,
  f) packaging in oxygen-barrier packaging under a modified atmosphere,
  g) storing at refrigeration temperature.

According to a particular embodiment, step f) is replaced by the steps:
  h) hardening the dough piece by lowering to freezing temperature,
  i) vacuum-packing in oxygen-barrier packaging.

According to a particular embodiment, provided between steps d) and e) is a step:
  j) resting time of 5 to 30 minutes.

DETAILED DESCRIPTION

The pizza dough according to the invention is prepared on an industrial scale in order to provide the user, whether a food service professional or a consumer, with a product of highly regular quality which is easy to use in a few minutes and has the organoleptic qualities of a fresh, artisanal product. A fresh product is defined as a product prepared just before use, or a product that has not been frozen and kept frozen until use. Artisanal quality means a crumb with a heterogeneous structure and a soft texture combined with a golden-brown crust and a crispy texture.

The pizza dough can be stored at refrigeration temperature for up to 100 days, with an artisanal quality and a great ease of rolling out and stretching. A pizza dough, ready to be rolled out, before being topped and baked, is thus available to the user. The user is both a restaurant owner and a private individual, and in a few minutes the user can have a pizza ready for consumption.

Indeed, the pizza dough is in the form of a ball or roll, packed under vacuum or under modified atmosphere, composed of nitrogen and optionally carbon dioxide, with an oxygen content below 0.5%.

The pizza dough is stored at refrigeration temperature, i.e., below 8° C.

The user takes a pizza dough, rolls it out to the desired diameter and shape, tops it, and puts it in the oven for a few minutes before serving it.

These operations are simple, quick, and practically risk-free.

The simplicity, speed, and safety in carrying out the operations reserved for use are the consequences of the industrial preparation process of the pizza dough. This dough comprises, in percentage by weight of the finished product, the following constituents:

Flour: 50-65
Water: 20-35
Fats: 0-8
Salt: 0.7-2
Sugar: 0-2
Deactivated yeast: 0.05-0.15
Fermented flour: 0.1-2
Vinegar: 0.1-2
Baking powder: 0.5-2
Gums: 0.1-3

In this pizza dough, the flour is preferably a flour with an ash content of T40 or below.

The fats consist of sunflower fat, rapeseed oil, and olive oil. In an example embodiment, sunflower fat and rapeseed oil each constitute 50% by weight of the fats. In another example embodiment, sunflower fat, rapeseed oil, and olive oil each constitute one third by weight of the fats. In another example embodiment, the fat content is zero.

The fermented flour is dried and does not contain any living microorganisms, which allows the pizza dough to have a shelf life of 100 days.

Vinegar is a natural product with a very low risk of sanitary incompatibility.

The baking powders advantageously comprise potassium bicarbonate, rather than sodium bicarbonate, and glucono-delta-lactone as slow acidifier. Preferably, their relative proportions are potassium bicarbonate (30 to 55%) and glucono-delta-lactone (45 to 70%). With or instead of glucono-delta-lactone, other acidifiers may be used, for example in a mixture, and in particular organic acids.

The gums are advantageously constituted by a mixture of xanthan and guar flour in proportions comprised between 50 and 70% for xanthan and 30 to 50% for guar flour. According to a particular example embodiment, chicory fibre may replace either or both of the gums.

The process for preparing the pizza dough according to the invention comprises the following steps:

1) mixing the dry constituents,
2) adding the liquid constituents,
3) kneading of all the components for 3 to 9 minutes,
4) dividing into dough pieces of the desired weight,
5) rolling of the dough pieces,
6) rolling out according to the desired final format, ball or roll,
7) packaging in oxygen-barrier packaging, under a modified atmosphere based on nitrogen and optionally carbon dioxide,
8) storing at refrigeration temperature for up to 100 days.

Advantageously, a resting time of 5 to 30 minutes may be provided between the rolling of the dough pieces and the rolling out.

According to an alternative embodiment, step 7 is replaced by a step of lowering the temperature in an enclosure at a temperature comprised between −20° C. and −35° C. until the core of the pizza dough is at −4° C. The pizza dough is then vacuum-packed. The pizza dough is then stored at refrigeration temperature, below 8° C., up to at least 100 days.

The combination of low-ash flour, fats, fermented flour, vinegar, baking powders, and gums, together with appropriate packaging to ensure an oxygen level below 0.5% throughout the shelf life of the pizza dough, makes it possible to achieve this shelf life of about 100 days in terms of organoleptic quality and microbiological quality.

The invention claimed is:

1. A pizza dough for later use, comprising, in percentage by weight of the finished product:
   flour: 50-65
   water: 20-35
   fats: 0-8
   salt: 0.7-2
   sugar: 0-2
   deactivated yeast: 0.05-0.15
   wherein said pizza dough further comprises, in percentage by weight of the finished product:
   fermented flour: 0.1-2
   vinegar: 0.1-2
   baking powders: 0.5-2
   gums: 0.1-3
   wherein the baking powders are a mixture of potassium bicarbonate in percentage by weight of the baking powders of 30% to 55% and of glucono-delta-lactone in percentage by weight of the baking powders of 45% to 70% as slow acidifier.

2. The pizza dough according to claim 1, wherein the gums are a mixture of xanthan 50 to 70% and guar flour 30 to 50%.

3. The pizza dough according to claim 1 wherein the gums comprise chicory fiber.

4. The pizza dough according to claim 1, wherein the fats consist of sunflower fat, rapeseed oil, and olive oil.

5. The pizza dough according to claim 1, wherein the fats consist of sunflower fat and rapeseed oil each in the proportion of 50% by weight of the fats.

6. The pizza dough according to claim 4, wherein sunflower fat, rapeseed oil, and olive oil each constitute one third of the weight of the fats.

7. The pizza dough according to claim 1, wherein the flour has an ash content of T40 or below.

8. A process for preparing pizza dough for later use according to claim 1, wherein said process comprises the steps of:
   a) mixing the dry components and then adding the liquid components,
   b) kneading for between 3 and 9 minutes,
   c) dividing into dough pieces of the desired weight,
   d) rolling the dough pieces,
   e) rolling out according to the desired final format: ball or roll,
   f) packaging in an oxygen-barrier package under a modified atmosphere, and
   g) storage at refrigeration temperature.

9. The process according to claim 8, wherein step f) is replaced by the steps of:
   h) hardening the dough piece by lowering to freezing temperature,
   i) vacuum-packing in oxygen-barrier packaging.

10. The process according to claim 8, wherein, provided between steps d) and e) is a step:
   j) resting time of 5 to 30 minutes.

* * * * *